United States Patent

[11] 3,630,504

| [72] | Inventor | Jack B. Reynolds<br>Ludington, Mich. |
| --- | --- | --- |
| [21] | Appl. No. | 732 |
| [22] | Filed | Jan. 5, 1970 |
| [45] | Patented | Dec. 28, 1971 |
| [73] | Assignee | The Dow Chemical Company<br>Midland, Mich. |

[54] METHOD OF CALCINATION AND HYDRATION AND UNIT THEREFOR
3 Claims, 2 Drawing Figs.

| [52] | U.S. Cl. | 263/53 R,<br>23/186 |
| --- | --- | --- |
| [51] | Int. Cl. | C04b 1/02 |
| [50] | Field of Search | 263/53, 53<br>A; 23/186; 106/118 |

[56] References Cited
UNITED STATES PATENTS

| 1,709,226 | 4/1929 | Nahikian et al. | 263/53 |
| --- | --- | --- | --- |
| 2,015,866 | 10/1935 | Nielsen | 263/53 |
| 2,474,207 | 6/1949 | Lovell | 263/53 X |
| 3,365,521 | 1/1968 | Brachthauser | 263/53 |

Primary Examiner—John J. Camby
Attorneys—Griswold and Burdick, Stephen S. Grace and William R. Norris ABSTRACT: An improved method of calcining and hydrating limestone wherein the heat of hydration of lime is recycled to calcine further limestone to lime. By so doing, the amount of external heat necessary for calcination is significantly reduced. A combined kiln-hydrator unit containing a calcination chamber, a hydration chamber with heat diffuser and product conduit therebetween, which can be employed in the present method, is also disclosed.

PATENTED DEC 28 1971　　3,630,504

INVENTOR.
Jack B. Reynolds
BY

ATTORNEY

METHOD OF CALCINATION AND HYDRATION AND UNIT THEREFOR

BACKGROUND OF THE INVENTION

The present invention relates to a method of calcining and hydrating limestone materials.

The term "limestone" as used herein refers to $CaCO_3$ and any limestone-containing material, such as dolomite. The term "lime" refers generally to the calcined limestone products, e.g. CaO or dolime.

There are many processes which require $Ca(OH)_2$ as a raw material. $Ca(OH)_2$ is produced from limestone by calcination and hydration via the following reactions:

(A) $CaCO_3 + heat \longrightarrow CaO + CO_2 \uparrow$ (B) $CaO + H_2O \longrightarrow Ca(OH)_2 + heat$ As noted the calcination reaction (A) requires heat, usually supplied by an external source. The hydration reaction (B), on the other hand, is exothermic.

A principle object of the present invention is to provide an improved method of limestone calcination and hydration.

A further object is to provide a calcination and hydration method which requires less external heat for calcination.

A still further object is to provide a calcination-hydration unit for carrying out such method.

THE INVENTION

The present invention comprises the improvement of recycling the exothermic heat of hydration of the lime to supply heat for calcination of further limestone. By so recycling the exothermic heat of hydration, less external heat is necessary to calcine the limestone, thereby making the process more efficient and less expensive.

Figure 1:
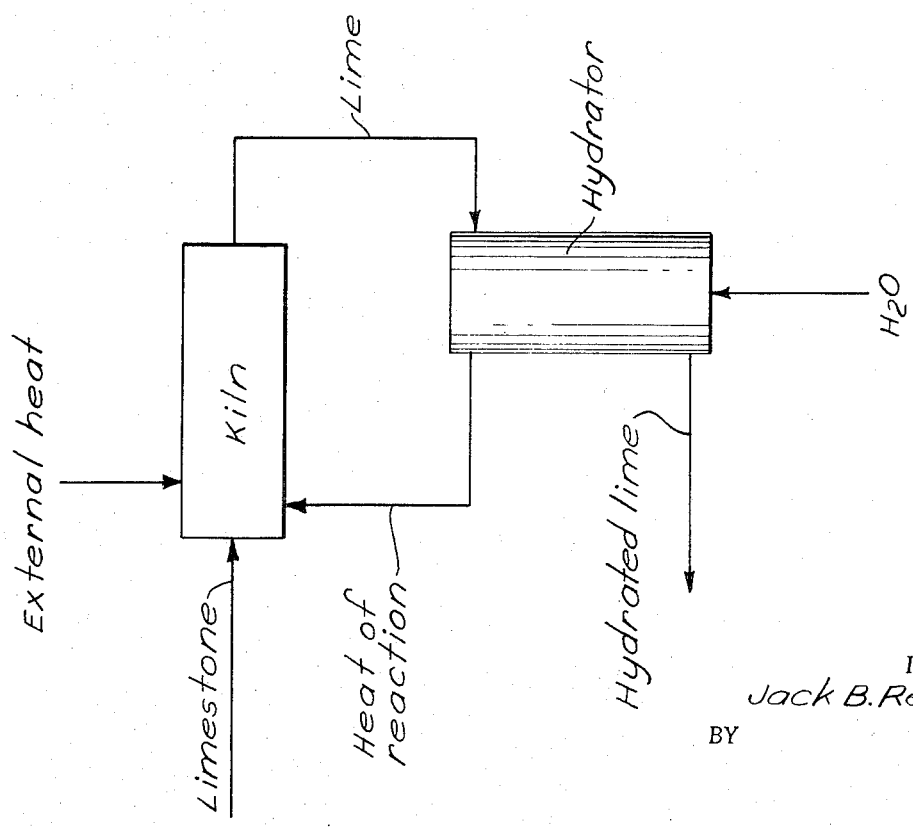
FIG. 1 is a heat and mass-flow diagram of one embodiment of the present method.

Referring to FIG. 1, limestone is fed into a calcining kiln where heat is applied to convert the limestone to lime. Conventionally such heat is obtained from an external source. Normally calcination is carried out at temperatures on the order of 1,000° to 1,500° C. Theoretically about 41 kilocalories are required to convert one mole of $CaCO_3$ to CaO.

The lime is then removed from the kiln and fed into a hydrator where it is admixed with water, e.g. in a rotary-type slaker bed operation, to produce hydrated lime. As noted, this reaction is exothermic theoretically giving off about 23 kilocalories per mole of CaO converted to $Ca(OH)_2$.

In accordance with the present invention, this heat of reaction, which amounts to more than half the heat required for calcination, is recycled to the kiln to calcine further limestone. Recycling can be accomplished directly by passing the hot gases heated by the heat of reaction from the hydrator into the kiln or indirectly by heat transfer through a liquid medium. The heat is recycled directly to the kiln or passed into the limestone prior to entering the kiln to preheat the limestone (not shown in FIG. 1). Thus the present method permits the amount of necessary external heat to be reduced by more than one half.

The hydrated lime is removed from the hydrator and used for example as a reactant with $MgCl_2$ brine to produce $Mg(OH)_2$ and $CaCl_2$.

Figure 2:
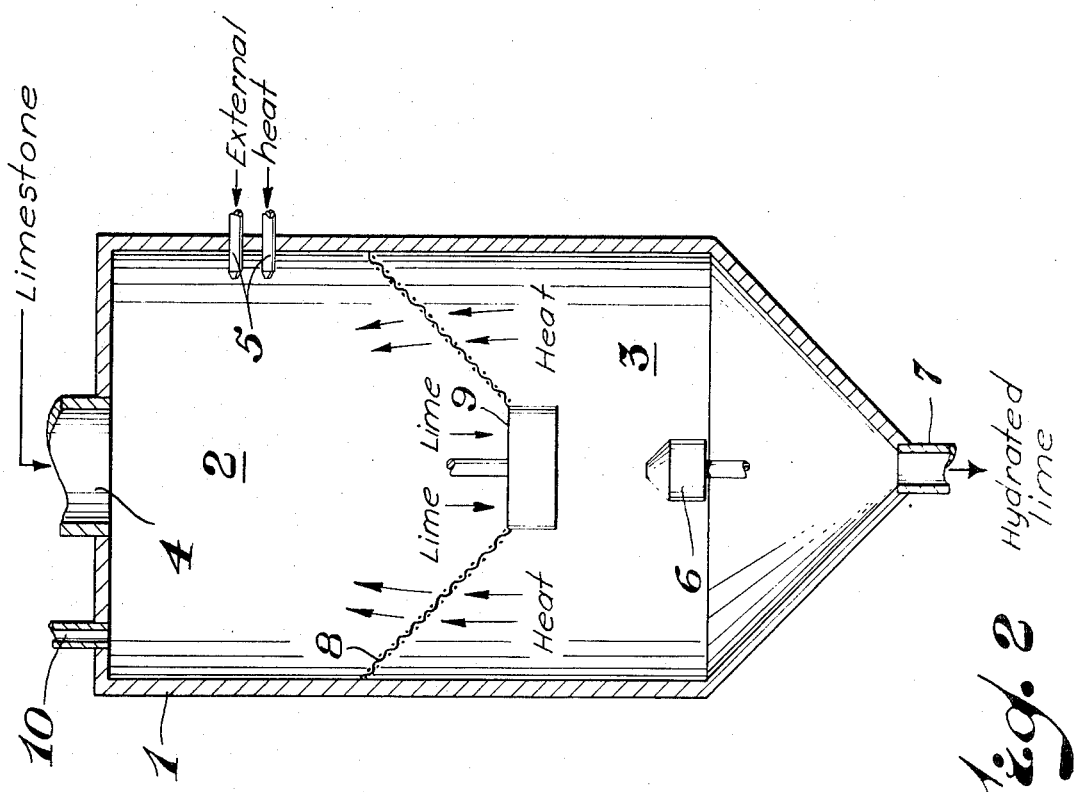
FIG. 2 is a cross section of a combined kiln-hydrator unit which could be used to carry out a preferred embodiment of the present method.

FIG. 2 depicts apparatus for carrying out a preferred manner for recycling the heat of hydration.

The apparatus comprises a kiln-hydrator unit 1 containing a kiln or calcination chamber 2 and hydration chamber 3. The calcination chamber has an opening 4 for limestone raw material input, gas outlet 10 and external heating means, e.g. burners 5. The hydration chamber has a water input means such as a spray nozzle 6, and a product exit 7. The calcination chamber 2 and the hydration chamber 3 are separated by a heat-diffusing means 8, which permits heat in the form of hot gases to pass into the calcination zone from the hydration zone, and conduit means 9, which allows the calcined raw material, e.g. CaO, to pass into the hydration zone. The heat diffuser 8 can be a suitable grid or seal which allows heat to rise into the calcination chamber but prevents the lime from passing directly into the hydration chamber, e.g. a screen of small mesh size. Conduit means 9 can be any suitable controllable passageway. For example, the conduit could consist of two parallel plates rotatable with respect to one another and each containing a set of holes of a size large enough to allow the calcined material to pass through. When the plates are rotated into a position where the sets of holes match (or partially match) the calcined material will pass into the hydration chamber. The flow can be restricted or turned off by rotating the plates to a position where some or all of the holes are not coincident.

In the preferred method, using the kiln-hydrator unit, limestone is fed through input 4 into the calcination chamber. External heat is supplied through burners 5 to calcine the limestone to lime. The lime exits through conduit 9 into the hydration chamber. Water, supplied by inlet means 6 is admixed with the incoming lime to produce $Ca(OH)_2$ which passes out of the unit through exit conduit 7. The exothermic heat of hydration heats the gas, e.g. air, in the hydration chamber which pass through the heat-diffusing means 11 into the calcination chamber where it supplies heat to calcine further limestone. In this manner the external heat necessary to calcine is significantly reduced.

During the start up of the unit to insure that only calcined raw material passes into the hydration zone, the conduit 9 can be closed until an initial batch of limestone has been calcined. Alternatively, the calcination zone can be at least partially filled with previously calcined material, e.g. CaO, and this material passed through the conduit until fresh raw materials provide the calcined lime.

The hydrated lime produced could, for example, be fed directly to a precipitator where it reacts with a Mg. ion-containing brine to produce $Mg(OH)_2$.

What is claimed is:

1. In the process of calcining and hydrating limestone, the improvement which comprises recycling the exothermic heat of hydration to provide a partial source of heat for calcining, thereby reducing the amount of external heat necessary to calcine.

2. A process which comprises:
   a. feeding limestone into the kiln of a combined kiln-hydrator unit;
   b. calcining the limestone to produce lime;
   c. passing the lime from the kiln into the hydrator;
   d. hydrating the lime to produce $Ca(OH)_2$ and exothermic heat of reaction;
   e. passing said heat of reaction in the form of heated gas from the hydrator into the kiln to heat further limestone, thereby reducing the amount of external heat necessary to calcine.

3. A shaft kiln-hydrator unit which comprises:
   a. a calcination chamber containing raw material input and external heat means;
   b. a hydration chamber containing a water inlet means and a product exit;
   c. conduit means, connected between the calcination zone and the hydration zone, which permits removal of the calcined raw material from the calcination zone into the hydration zone; and
   d. heat-diffusing grid means, connected between the calcination zone and the hydration zone, which permits hot gases to flow from the hydration zone into the calcination zone.

* * * * *